United States Patent
Jan et al.

(10) Patent No.: US 9,268,135 B2
(45) Date of Patent: Feb. 23, 2016

(54) HEAD-UP PROJECTION SYSTEM

(71) Applicant: DELTA ELECTRONICS, INC., Taoyuan Hsien (TW)

(72) Inventors: Sheng-Hsiung Jan, Taoyuan Hsien (TW); Tu-Fa Lai, Taoyuan Hsien (TW)

(73) Assignee: DELTA ELECTRONICS, INC., Taoyuan Hsien (TW)

( * ) Notice: Subject to any disclaimer, the term of this patent is extended or adjusted under 35 U.S.C. 154(b) by 160 days.

(21) Appl. No.: 14/010,310

(22) Filed: Aug. 26, 2013

(65) Prior Publication Data

US 2014/0313586 A1 Oct. 23, 2014

Related U.S. Application Data

(60) Provisional application No. 61/813,834, filed on Apr. 19, 2013.

(51) Int. Cl.
*G02B 27/14* (2006.01)
*G02B 27/01* (2006.01)
*G02B 5/02* (2006.01)

(52) U.S. Cl.
CPC .............. *G02B 27/0149* (2013.01); *G02B 5/02* (2013.01); *G02B 2027/0156* (2013.01)

(58) Field of Classification Search
CPC ................... G02B 2027/0156; G02B 27/0149; G02B 5/02
USPC ................................ 359/630–633; 353/11–17

See application file for complete search history.

(56) References Cited

U.S. PATENT DOCUMENTS

| | | | |
|---|---|---|---|
| 4,962,998 A * | 10/1990 | Iino | 359/630 |
| 6,292,305 B1 * | 9/2001 | Sakuma et al. | 359/649 |
| 6,577,932 B1 * | 6/2003 | Van Beurden et al. | 701/21 |
| 7,271,960 B2 * | 9/2007 | Stewart | G02B 27/0101 345/7 |
| 2002/0008497 A1 * | 1/2002 | Tanaka et al. | 320/128 |
| 2009/0189831 A1 | 7/2009 | Chevion et al. | |
| 2012/0191342 A1 | 7/2012 | Kang et al. | |

FOREIGN PATENT DOCUMENTS

| | | |
|---|---|---|
| JP | 2003-207340 | 7/2003 |
| JP | 2012-108397 | 6/2012 |
| JP | 2013-067209 | 4/2013 |
| TW | 201024133 | 7/2010 |

* cited by examiner

*Primary Examiner* — Thomas K Pham
*Assistant Examiner* — Vipin Patel
(74) *Attorney, Agent, or Firm* — Kirton McConkie; Evan R. Witt

(57) ABSTRACT

A head-up projection system is disclosed. The head-up projection system comprises a mounting member and a portable projector. The mounting member has a receptacle, and the mounting member is mounted on a roof of a vehicle. The portable projector is detachably installed in the receptacle of the mounting member and configured to connect with a mobile communication and computing device with a navigation function for displaying a navigation information image in the vehicle from the mobile communication and computing device.

13 Claims, 17 Drawing Sheets

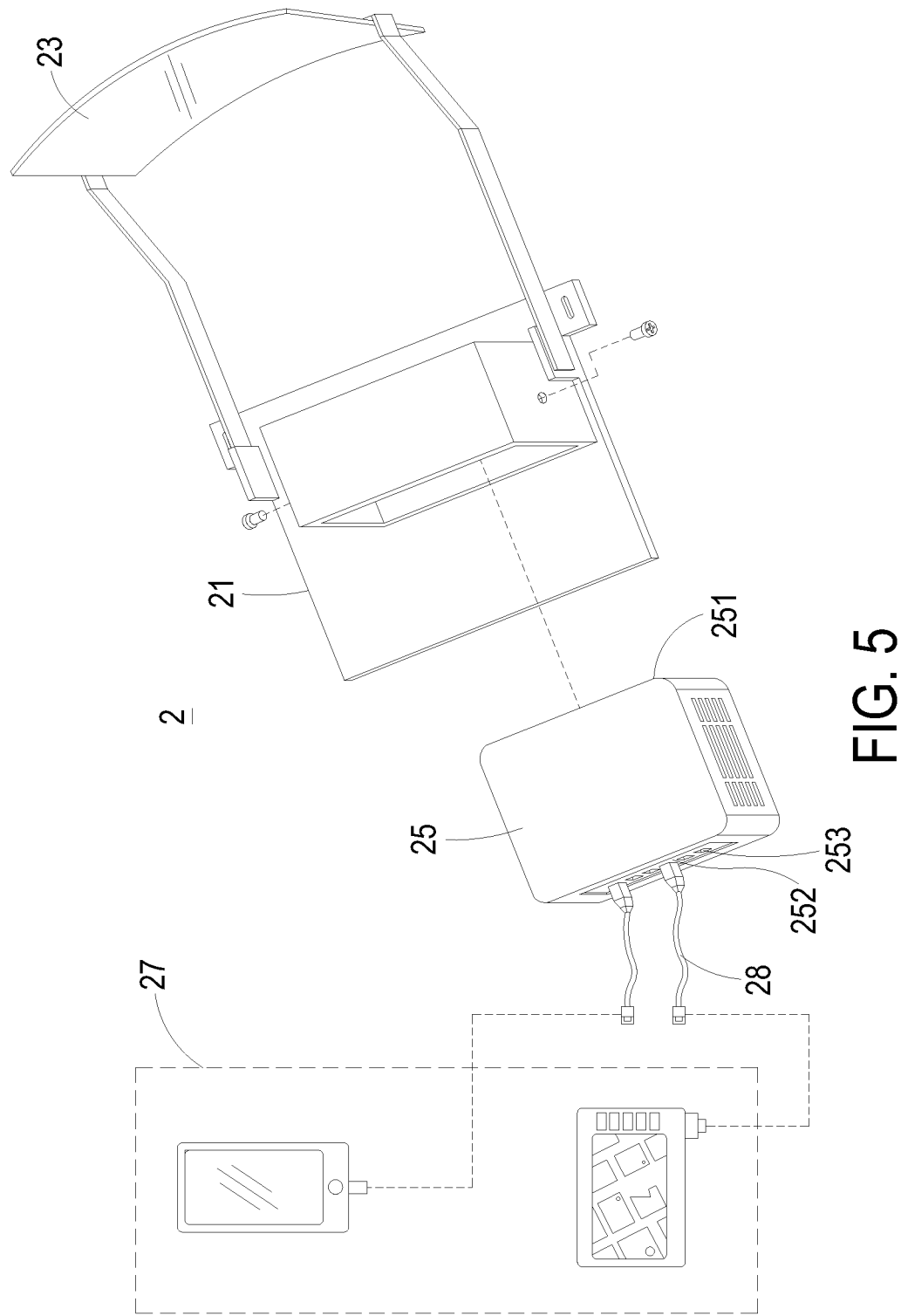

HEAD-UP PROJECTION SYSTEM

CROSS-REFERENCE TO RELATED APPLICATION

This application claims the benefit of U.S. Provisional Application No. 61/813,834 filed on Apr. 19, 2013, and entitled "HEAD-UP PROJECTION SYSTEM", the entirety of which is hereby incorporated by reference.

FIELD OF THE INVENTION

The present invention relates to a projection system, and more particularly to a head-up projection system for displaying navigation information.

BACKGROUND OF THE INVENTION

In recent years, navigation system is widely used to guide a traveler to a desired destination. Usually, a global positioning system (GPS) transceiver and a navigation database are employed in the navigation system for obtaining the location of the traveler. Then, the position of the traveler is compared to a desired destination by a central processing unit of the navigation system, and visual and audio indications for guiding the traveling routes to the desired destination can be provided to the traveler via the display and loudspeaker of the navigation system.

In order to facilitate the use of a navigation system in vehicle, a head-up display (HUD) system can be employed for displaying the navigation information to the driver. The head-up display system projects a virtual image onto a specific area of the windshield that is reflected at eye level with the driver. By using the head-up display system, the driver doesn't need to look away from the road to obtain the navigation information. Consequently, the driving safety is enhanced.

US patent application publication No. US 20120191342A1 has disclosed an information displaying system for use with a vehicle head-up display. Referring to FIG. 1, the head-up display system 1 includes a liquid crystal panel 10 and a backlight unit 12 arranged at the rear side of the liquid crystal panel 10. The liquid crystal panel 10 is installed inside of an instrument panel 10a in front of a driver seat so that it can display a driving information image. The backlight unit 12 is used as a light source for irradiating light on the rear surface of the liquid crystal panel 10. The head-up display system 1 further includes an optical unit 14 arranged at the front side of the liquid crystal panel 10 and a reflection mirror 16 installed at the front side of the optical unit 14 at a specific angle. The optical unit 14 is used to enlarge or reduce the driving information image appearing on the liquid crystal panel 10 and to adjust the focal distance of the driving information image projected through the optical unit 14 toward the windshield 18 of the vehicle. Therefore, the driving information image can be displayed on the windshield 18.

However, the optical devices of the conventional head-up display system are installed inside of the instrument panel in front of a driver seat. It is hard for the driver or operator to self install the head-up display system in the vehicle, and the cost of installing the head-up display system in the vehicle is relatively high. In addition, the conventional head-up display system installed in the vehicle can only be used to display driving information image when the vehicle is in use. However, when the vehicle isn't in use, the head-up display system are turned off and can't be taken away from the vehicle to provide various presentation or image display functions outside the vehicle. Furthermore, the conventional head-up display system projecting the light directly upon the specific area of the windshield usually requires a coating material that significantly decreases the transparency of the windshield. As a result, the conventional head-up display system is restricted to limited region upon the windshield.

In addition, the image resolution of the conventional head-up display system doesn't conform to the practical requirements, and the image size projected on the specific area of the windshield can't be well controlled and may be smaller than the specific area of the windshield. Furthermore, the driving information image projected from the conventional head-up display system can only be displayed at the specific area of the windshield, and the conventional head-up display system can't adjust or change the image display height of the driving information image according to the eyes positions of various drivers.

Therefore, there is a need of providing an improved head-up projection system for displaying navigation information to obviate the drawbacks encountered from the prior arts.

SUMMARY OF THE INVENTION

The present invention provides a head-up projection system, which is useful, easy and simple to be installed in a variety of vehicles and is less costly to produce and install.

The present invention also provides a head-up projection system having a detachable projector. The projector can be mounted on the roof of the vehicle via a mounting member and connected to a mobile communication and computing device with navigation function so that the navigation information can be displayed via the head-up projection system from the mobile communication and computing device. In addition, when the head-up projection system isn't in use, the projector can be taken away from the vehicle for providing various presentation or image display functions outside the vehicle.

The present invention also provides a roof-mounted head-up projection system and a mounting member thereof. The roof-mounted head-up projection system has an optical path different from that of a conventional head-up display system, so that the image resolution of the head-up projection system is enhanced and the image size can be well controlled to match with the size of the optical screen of the head-up projection system. In addition, the issues of image distortion can be avoided. Moreover, the roof-mounted head-up projection system and the mounting member have simple structures, so that the driver can install the roof-mounted head-up projection system in the vehicle easily and simply by himself.

The present invention also provides a navigation system with a roof-mounted head-up projection system for displaying navigation information.

In accordance with an aspect of the present invention, the head-up projection system comprises a mounting member and a portable projector. The mounting member has a receptacle, and the mounting member is mounted on a roof of a vehicle. The portable projector is detachably installed in the receptacle of the mounting member and configured to connect with a mobile communication and computing device with a navigation function for displaying a navigation information image in the vehicle from the mobile communication and computing device.

In accordance with another aspect of the present invention, the head-up projection system comprises a mounting member, a portable projector, an optical screen, and an optical unit. The mounting member has a receptacle, and the mounting member is detachably mounted on a roof of a vehicle. The portable projector is detachably installed in the receptacle of the mounting member. The optical unit is disposed at an optical path between the portable projector and the optical screen for forming an intermediate real image of an image from the portable projector. The optical screen is configured to form an enlarged virtual image of the intermediate real image and reflect a light from the optical unit toward the eyes of a driver.

The above contents of the present invention will become more readily apparent to those ordinarily skilled in the art after reviewing the following detailed description and accompanying drawings, in which:

BRIEF DESCRIPTION OF THE DRAWINGS

FIG. 5 schematically illustrates a navigation system according to an embodiment of the present invention, wherein the portable projector of the head-up projection system is connected to a mobile communication and computing device with navigation function;

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
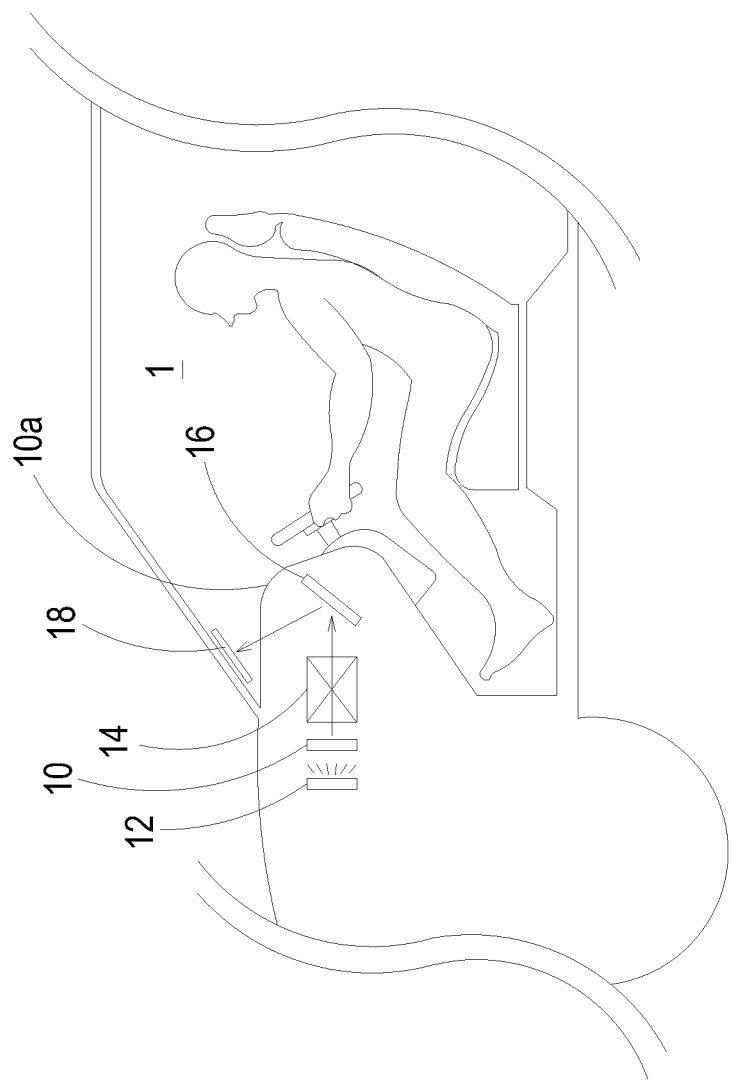
FIG. 1 schematically illustrates a conventional head-up display system for displaying navigation information in a vehicle.
Figure 2:
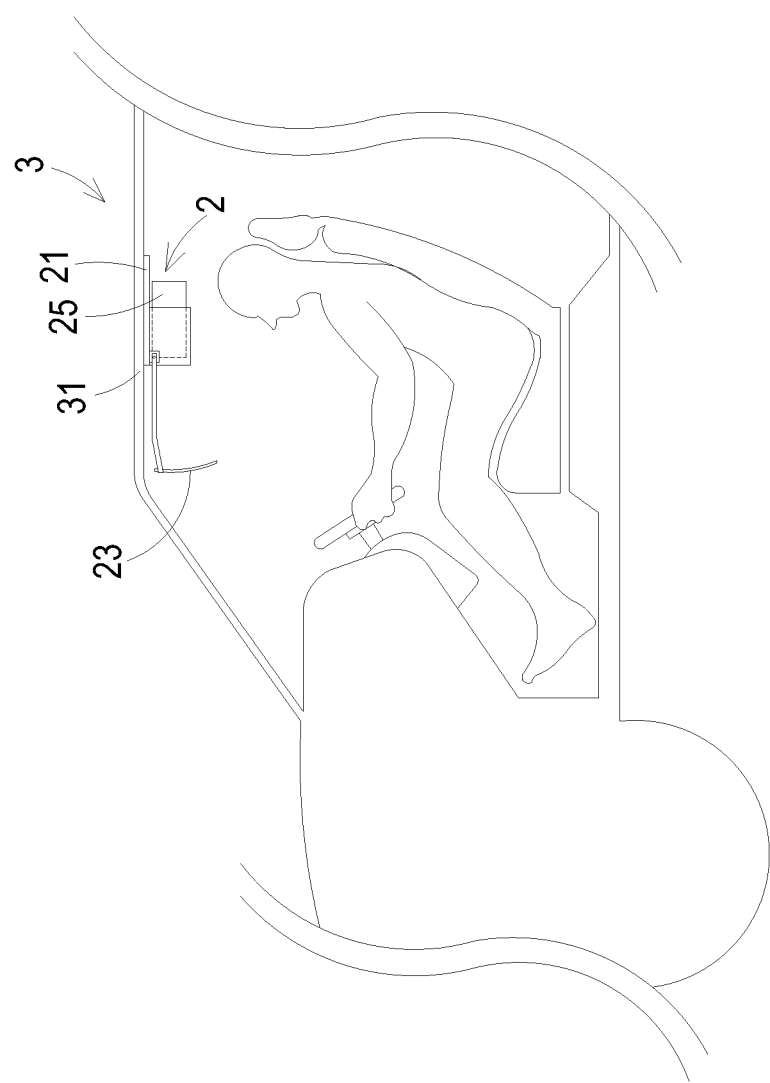
FIG. 2 schematically illustrates a head-up projection system for displaying navigation information in a vehicle according to a first preferred embodiment of the present invention.
Figure 3A:
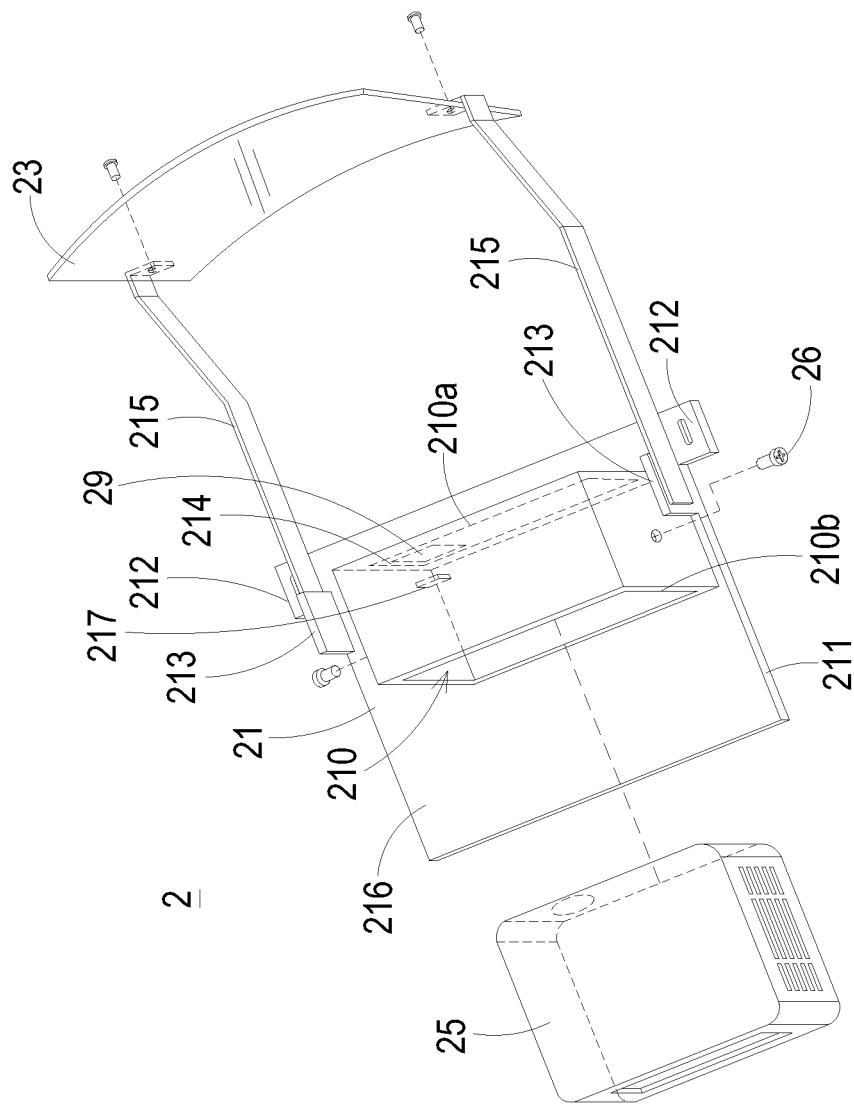
FIG. 3A schematically illustrates the configuration of the head-up projection system as shown in FIG. 2, wherein the portable projector is detached from the mounting member.
Figure 3B:
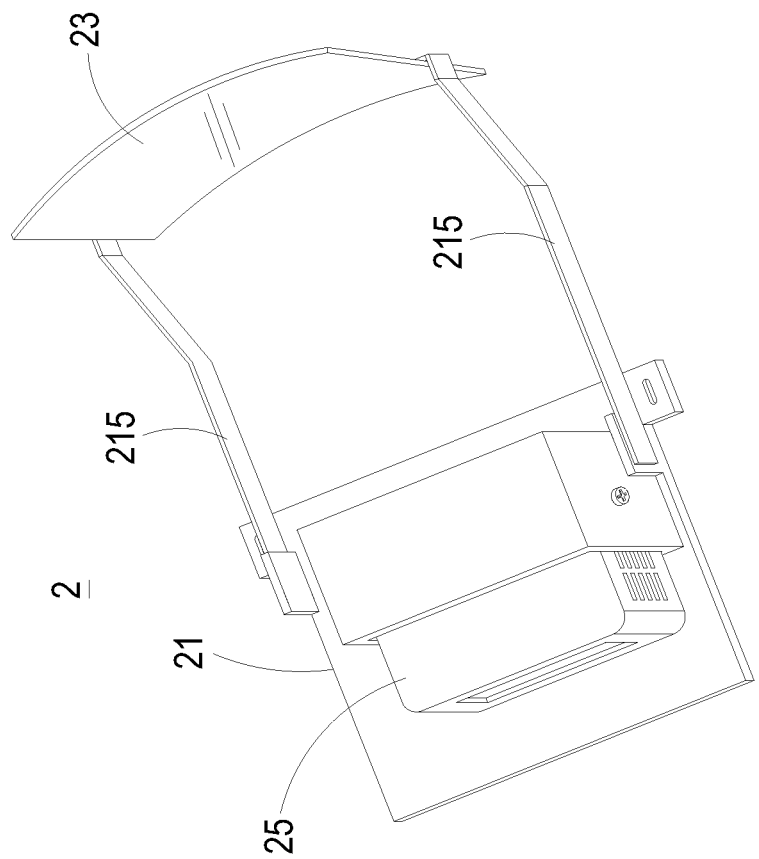
FIG. 3B schematically illustrates the configuration of the head-up projection system as shown in FIG. 2, wherein the portable projector is accommodated in the receptacle of the mounting member.
Figure 4B:
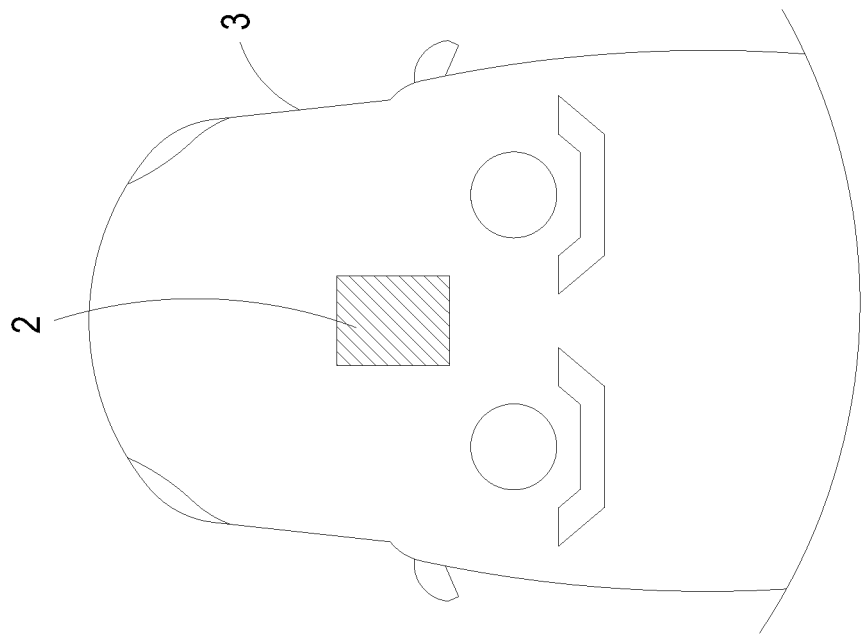
FIGS. 4A and 4B are schematic views showing the head-up projection system of FIGS. 3A and 3B mounted on and secured to various areas of the roof of the vehicle.
Figure 4A:
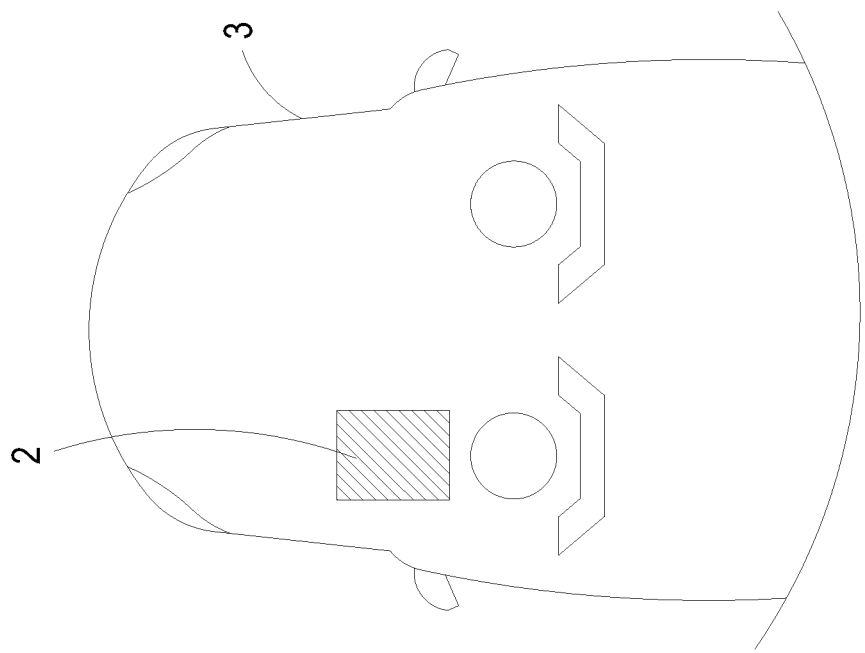

Please refer to FIGS. 2, 3A and 3B. FIG. 2 schematically illustrates a head-up projection system for displaying navigation information in a vehicle according to a first preferred embodiment of the present invention. FIG. 3A schematically illustrates the configuration of the head-up projection system as shown in FIG. 2, wherein the portable projector is detached from the mounting member. FIG. 3B schematically illustrates the configuration of the head-up projection system as shown in FIG. 2, wherein the portable projector is accommodated in the receptacle of the mounting member. The head-up projection system 2 of the present invention can be mounted on and secured to a specific area of a roof 31 of a vehicle 3 (i.e. an automobile or car). For example, the head-up projection system 2 can be mounted on and secured to the area of the roof 31, where a sun shield plate is mounted on, to replace the sun shield plate. Namely, the head-up projection system 2 can be disposed right above the driver's seat, as shown in FIG. 4A. Alternatively, the head-up projection system 2 can be mounted on and secured to the middle area of the roof 31 between the driver's seat and the navigator's seat (i.e. the passenger seat). Namely, the head-up projection system 2 can be disposed above but misaligned with the driver's seat, as shown in FIG. 4B. It is noted that the area of the roof 31 for mounting the head-up projection system 2 can be varied according to the practical requirements.

The head-up projector system 2 of the present invention comprises a mounting member 21, an optical screen 23, a portable projector 25, and an optical unit 29. The portable projector 25 can be a handheld projector, a pocket projector, a mini projector or a MEMs laser pico-projector, but it is not limited thereto. The mounting member 21 is detachably mounted on and secured to the specific area of the roof 31 of the vehicle 3. The mounting member 21 has a receptacle 210 for receiving or accommodating the portable projector 25. The portable projector 25 is detachably accommodated in the receptacle 210 of the mounting member 21 and can be fixed and positioned in the mounting member 21 by using at least one fastening device 26, for example screws, rivets or engaging elements. Consequently, the portable projector 25 can be installed into or detached from the mounting member 21 easily and rapidly. In this embodiment, the mounting member 21 has a supporting plate 211, at least two ear elements 212, at least two extension plates 213, a frame 214, and two arms 215. The frame 214 is disposed at one surface 216 of the supporting plate 211 and defines the receptacle 210 with the supporting plate 211. Alternatively, the frame 214 has four sidewalls defining the receptacle 210. The receptacle 210 has a first opening 210a and a second opening 210b. The portable projector 25 can be accommodated in the receptacle 210 of the mounting member 21 from the second opening 210b and can be fastened to the frame 214 by using at least one fastening device 26, for example screws, rivets or engaging elements.

In an embodiment, two ear elements 212 of the mounting member 21 are extended outwardly from and horizontally with two opposite side edges of the supporting plate 211, respectively, and two ear elements 212 are opposite to each other. Each of the two ear elements 212 has a through hole or a through slot for allowing a fixing element (for example screw, rivet or engaging element) to pass through and secured to the roof 31 of the vehicle 3, so that the mounting member 21 can be mounted on and secured to the specific area of the roof 31 of the vehicle 3. Two extension plates 213 of the mounting member 21 are extended outwardly from the two opposite side edges of the supporting plate 211 and vertically to the surface 216 of the supporting plate 211, respectively, and two extension plates 213 are opposite to each other. Each of the two arms 215 has a first end and a second end. The first ends of the two arms 215 are pivotally jointed to the two extension plates 213, respectively. The second ends of the two arms 215 are jointed with two end connecting parts on the edges of the optical screen 23, respectively, so that the optical screen 23 can be supported by the two arms 215 and faces the optical unit 29 or the portable projector 25 with a specific distance or a constant distance. In an embodiment, the second ends of the two arms 215 are pivotally jointed with two end connecting parts on the edges of the optical screen 23, so that the optical screen 23 is foldable with the two arms 215. In some embodiment, the mounting member 21 comprises a stopper 217 for limiting the movement of the portable projector 25 within the receptacle 210 of the mounting member 21. Preferable, the stopper 217 is disposed on one inner surface of the frame 214.

The optical unit 29 is disposed at an optical path between the portable projector 25 and the optical screen 23. In this embodiment, the optical unit 29 is a diffuser and disposed at the first opening 210a of the frame 214 for forming an intermediate real image. Namely, an intermediate real image of the image from the portable projector 25 is formed by the optical unit 29. The optical unit 29 is also configured to distribute the light from the portable projector 25 uniformly, enlarge the image passing therethrough, and adjust the focal distance of the image projecting toward the optical screen 23. Preferably, the optical unit 29 is a ground glass diffuser, but it is not limited thereto.

The optical screen 23 is a semi-transparent reflector for forming an enlarged virtual image of the intermediate real image. Namely, the intermediate real image is magnified and projected on the optical screen 23 from the optical unit 29, and an enlarged virtual image of the intermediate real image is formed by the optical screen 23. Consequently, the portable projector 25 can project the light through the optical unit 29 toward the optical screen 23, and the light reflected by the optical screen 23 can be directed to the eyes of the driver, so that the navigation information image can be seen by the driver at the eyes level of the driver. In an embodiment, the optical screen 23 can be made of plastic, glass, polycarbonate, acrylic or other transparent material, and the optical screen 23 is coated with a partly reflecting material so as to form a semi-transparent reflector. The optical screen 23 is a concavo-convex semi-transparent reflector. Alternatively, the optical screen 23 may have a coating that reflect the monochromatic light projected onto it from the portable projector 25 while allowing other wavelengths of the light to pass through. The optical screen 23 can be provided to reflect an image toward the driver while minimizing interference with the driver's view of the road. In this way, the driver does not need to look away from the road to obtain the navigation information provided by the head-up projection system 2.

FIG. 5 schematically illustrates a navigation system according to an embodiment of the present invention, wherein the portable projector 25 of the head-up projection system 2 is connected to a mobile communication and computing device 27 with navigation function. Referring to FIGS. 2, 3A, 3B and 5, the portable projector 25 can be mounted on the roof 31 of the vehicle 3 via the mounting member 21 and connected to a mobile communication and computing device 27 with navigation function, so that the navigation information can be displayed via the head-up projection system 2 from the mobile communication and computing device 27. In addition, when the head-up projection system 2 isn't in use, the portable projector 25 can be detached from the mounting member 21 easily and rapidly and taken away from the vehicle 3 for providing various presentation or image display functions outside the vehicle 3. In an embodiment, the mobile communication and computing device 27 can be a smart phone, a PDA, an information-entertainment system, a computing apparatus or a GPS, which is located within the vehicle cabinet. The mobile communication and computing device 27 may include a navigation module or may access a navigation APP from a remote server, and the CPU of the mobile communication and computing device 27 can execute the programs of the navigation module or the navigation APP to provide the navigation functions. The portable projector 25 includes a casing 251 and a plurality of connecting ports 252. In an embodiment, the portable projector 25 further includes a power socket 253. The portable projector 25 can be connected to the mobile communication and computing device 27 via a signal transmission wire 28, so that the navigation information can be provided from the mobile communication and computing device 27 to the portable projector 25 for allowing the navigation information image to be displayed. The portable projector 25 may include a built-in rechargeable battery (not shown) for providing the electrical energy to operate the portable projector 25. Alternatively, the power socket 253 of the portable projector 25 can be connected to a power source of the vehicle 3 via a power cable (not shown), so that the electrical energy is provided to operate the portable projector 25.

Figure 6:
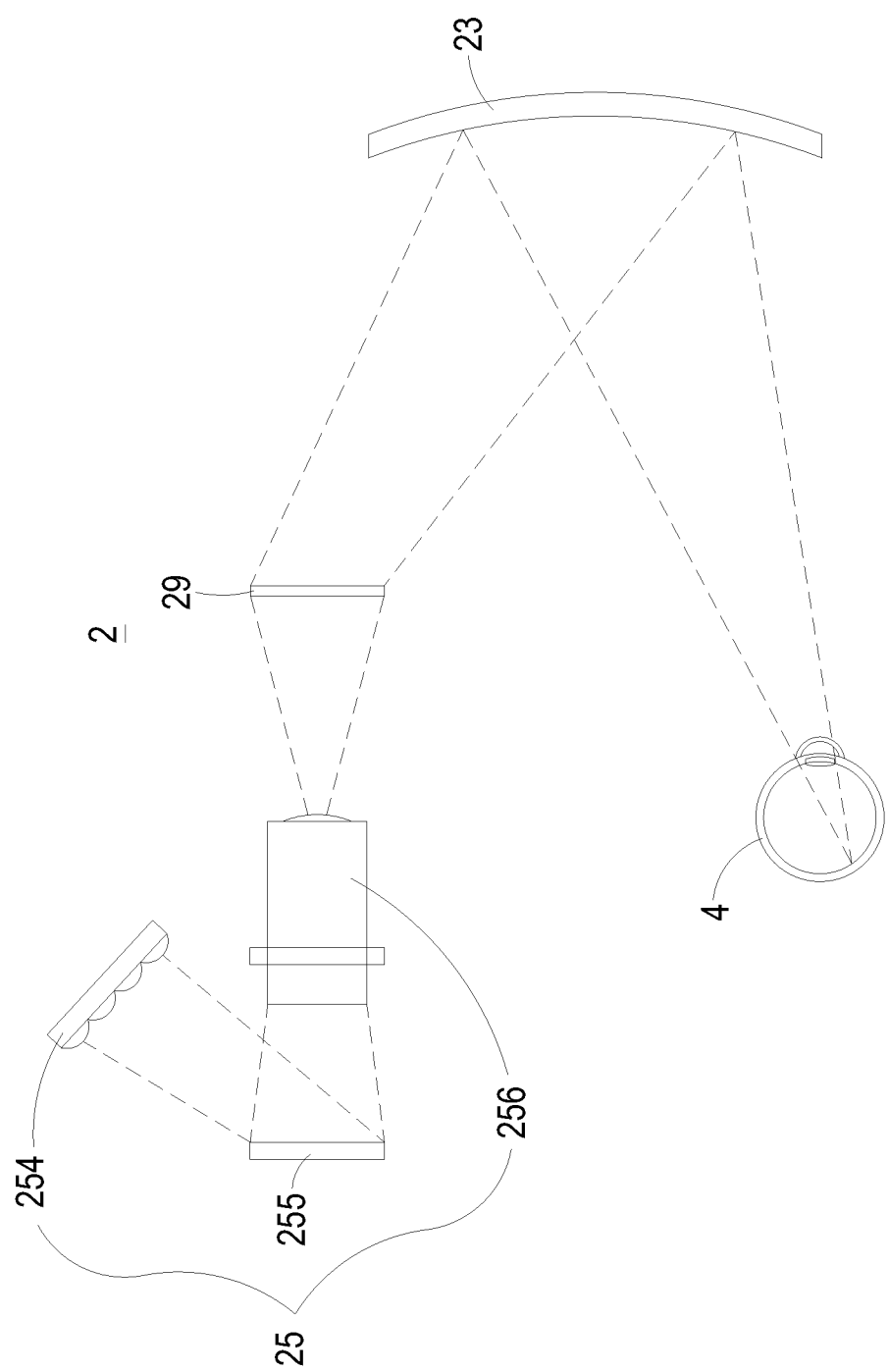
FIG. 6 schematically illustrates an optical path of the head-up projection system by using a first demonstrated portable projector.

FIG. 6 schematically illustrates an optical path of the head-up projection system by using a first demonstrated portable projector. In this embodiment, as shown in FIGS. 3A, 3B and 6, the portable projector 25 comprises a light source 254, an image generation unit 255, and a projection lens 256. Preferably, the image generation unit 255 is a digital micromirror device module (i.e. DMD module). The light source 254 can be a laser light source, a LED light source, a combination of a laser light source and a LED light source, or a lamp, but it is not limited thereto. The optical unit 29 is disposed at an optical path between the projection lens 256 of the portable projector 25 and the optical screen 23. Preferably, the optical unit 29 is a diffuser disposed at the first opening 210a of the frame 214 for forming an intermediate real image of the image from the DMD module 255. Namely, an intermediate real image of the image from the DMD module 255 is formed by the optical unit 29. The optical unit 29 is also configured to distribute the light from the projection lens 256 of the portable projector 25 uniformly, enlarging the image passing therethrough and adjusting the focal distance of the image projecting toward the optical screen 23. The intermediate real image is magnified and projected on the optical screen 23 from the optical unit 29, and an enlarged virtual image of the intermediate real image is formed by the optical screen 23. A portion of light passes through the optical screen 23 directly, and the other portion of the light is reflected by the optical screen 23 and can be directed to the eyes 4 of the driver, so that the navigation information image can be seen by the driver at the eyes level of the driver. Namely, the eyes 4 of the driver can see the intermediated real image on the optical unit 29 by the reflection of the optical screen 23. By using the optical unit 29 to be disposed at the first opening 210a of the frame 214 or selectively arranged in the optical path between the projection lens 256 of the portable projector 25 and the optical screen 23, the image resolution is enhanced and the image size projected on the optical screen 23 can be well controlled to match with the size of the optical screen 23. In some embodiment, the optical unit 29 comprises a diffuser and a neutral density filter (ND filter) (not shown). The neutral density filter is configured to reduce the intensity of all wavelengths or colors of light equally.

Figure 7:
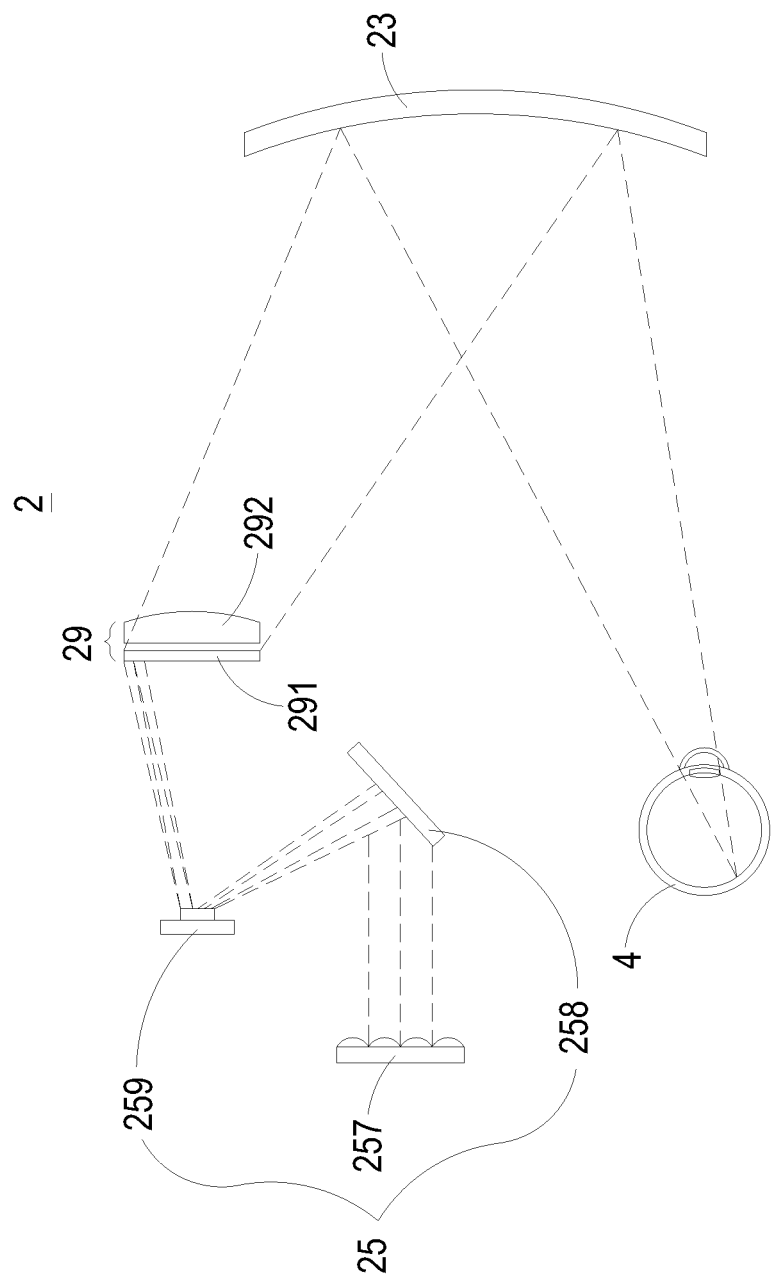
FIG. 7 schematically illustrates an optical path of the head-up projection system by using a second demonstrated portable projector.

FIG. 7 schematically illustrates an optical path of the head-up projection system by using a second demonstrated portable projector. In this embodiment, the portable projector 25 comprises a light source 257, an optical combiner 258 and a MEMs scanning mirror 259. The light source 257 can be a laser light source, a LED light source, or a combination of the laser light source and the LED light source. The optical combiner 258 is configured to combine the light from the light source 257. The optical unit 29 is disposed at an optical path between the MEMs scanning mirror 259 of the portable projector 25 and the optical screen 23. Preferably, the optical unit 29 includes a diffuser 291 and a condenser lens 292. An example of the condenser lens 292 includes but is not limited to a plano-convex lens. The optical unit 29 is disposed at the front of the MEMs scanning mirror 259 of the portable projector 25 for forming an intermediate real image of the image from the MEMs scanning mirror 259. Namely, an intermediate real image of the image from the MEMs scanning mirror 259 is formed by the optical unit 29. The optical unit 29 is also configured to distribute the light from the portable projector 25 uniformly, enlarging the image passing therethrough and adjusting the focal distance of the image projecting toward the optical screen 23. The intermediate real image is magnified and projected on the optical screen 23 from the optical unit 29, and an enlarged virtual image of the intermediate real image is formed by the optical screen 23. A portion of light passes through the optical screen 23 directly, and the other portion of the light is reflected by the optical screen 23 and can be directed to the eyes 4 of the driver, so that the navigation information image can be seen by the driver at the eyes level of the driver. Namely, the eyes 4 of the driver can see the intermediated real image on the optical unit 29 by the reflection of the optical screen 23. By using the optical unit 29 to be disposed at the first opening 210a of the frame 214 or selectively arranged in the optical path between the MEMs scanning mirror 259 of the portable projector 25 and the optical screen 23, the image resolution is enhanced and the image size projected on the optical screen 23 can be well controlled to match with the size of the optical screen 23. In some embodiment, the optical unit 29 further comprises a neutral density filter (not shown). The neutral density filter is configured to reduce the intensity of all wavelengths or colors of light equally.

Figure 8:
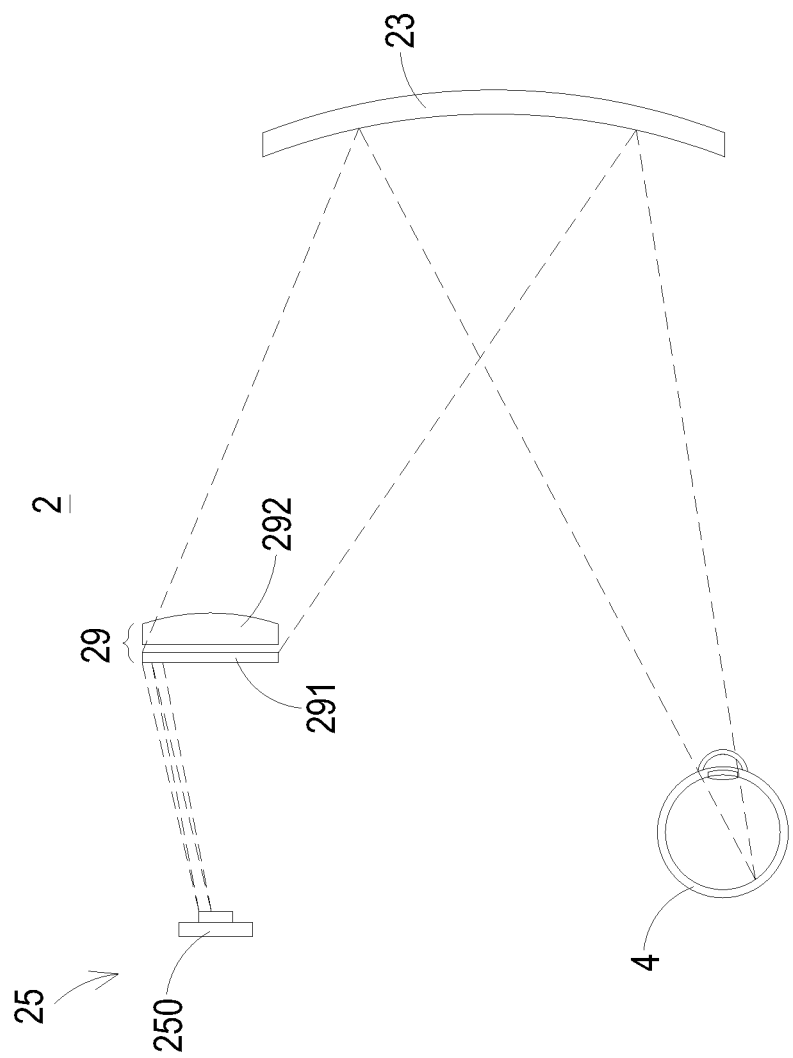
FIG. 8 schematically illustrates an optical path of the head-up projection system by using a third demonstrated portable projector.

FIG. 8 schematically illustrates an optical path of the head-up projection system by using a third demonstrated portable projector. In this embodiment, the portable projector 25 comprises an integrated MEMs 250 capable of emitting light beam by itself and generating the projection image toward the optical unit 29. The optical unit 29 is disposed at an optical path between the integrated MEMs 250 of the portable projector 25 and the optical screen 23. Preferably, the optical unit 29 includes a diffuser 291 and a condenser lens 292. An example of the condenser lens 292 includes but is not limited to a plano-convex lens. The optical unit 29 is disposed at the front of the integrated MEMs 250 of the portable projector 25 for forming an intermediate real image of the image from the integrated MEMs 250. Namely, an intermediate real image of the image from the integrated MEMs 250 of the portable projector 25 is formed by the optical unit 29. The optical unit 29 is also configured to distribute the light from the portable projector 25 uniformly, enlarging the image passing therethrough and adjusting the focal distance of the image projecting toward the optical screen 23. The intermediate real image is magnified and projected on the optical screen 23 from the optical unit 29, and an enlarged virtual image of the intermediate real image is formed by the optical screen 23. A portion of light passes through the optical screen 23 directly, and the other portion of the light is reflected by the optical screen 23 and can be directed to the eyes 4 of the driver, so that the navigation information image can be seen by the driver at the eyes level of the driver. Namely, the eyes 4 of the driver can see the intermediated real image on the optical unit 29 by the reflection of the optical screen 23. By using the optical unit 29 to be disposed at the first opening 210a of the frame 214 or selectively arranged in the optical path between the integrated MEMs 250 of the portable projector 25 and the optical screen 23, the image resolution is enhanced and the image size projected on the optical screen 23 can be well controlled to match with the size of the optical screen 23. In some embodiment, the optical unit 29 further comprises a neutral density filter (not shown). The neutral density filter is configured to reduce the intensity of all wavelengths or colors of light equally.

Figure 9:
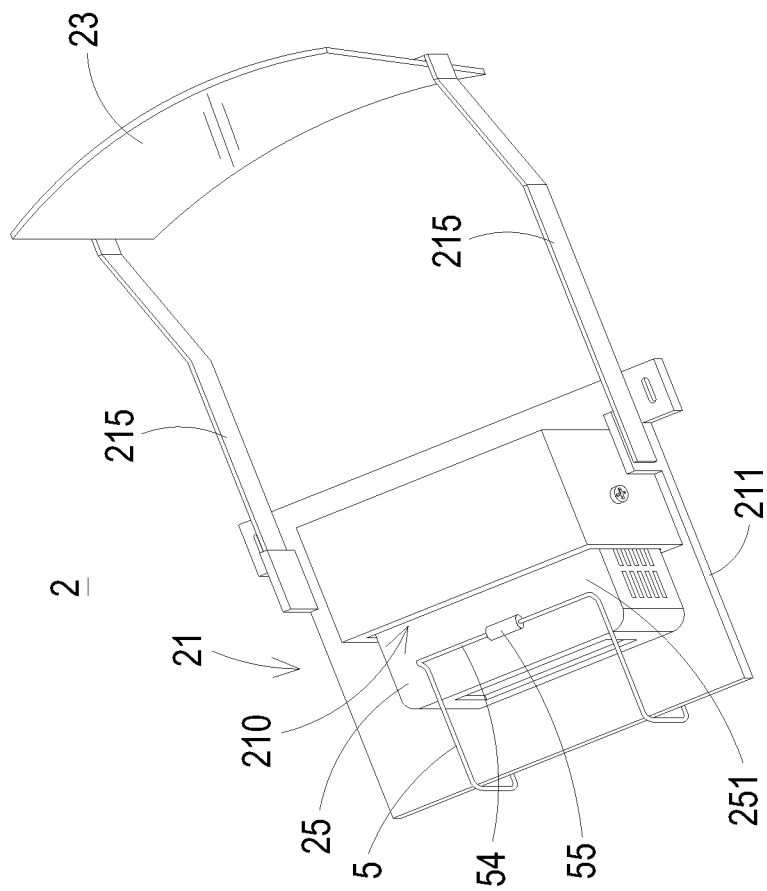
FIG. 9 schematically illustrates the configuration of the head-up projection system, wherein the portable projector is accommodated in the receptacle of the mounting member and secured to the mounting member by using a demonstrated fastening device.

FIG. 9 schematically illustrates the configuration of the head-up projection system, wherein the portable projector is accommodated in the receptacle of the mounting member and secured to the mounting member by using a demonstrated locking device. In this embodiment, the portable projector 25 is detachably accommodated in the receptacle 210 of the mounting member 21 and can be fixed and positioned in the mounting member 21 by using at least one locking device 5. The locking device 5 has two ends pivotally connected to two shaft sleeves formed at one side edge of the supporting plate 211 (not shown). The locking device 5 has a bending portion 54 with rubber ring 55. When the portable projector 25 is installed into the receptacle 210 of the mounting member 21, the locking device 5 is rotated toward a first position and the bending portion of the locking device 5 can bias against the casing 251 of the portable projector 25 via the rubber ring 55, so that the portable projector 25 is secured to the mounting member 21. When the user wants to detach the portable projector 25 form the mounting member 21, the locking device 5 is rotated toward a second position and the bending portion 54 with the rubber ring 55 of the locking device 5 is separated from the casing 251 of the portable projector 25, so that the portable projector 25 can be detached from the mounting member 21. Consequently, the portable projector 25 can be installed into or detached from the mounting member 21 easily and rapidly. It is noted that the structure of the locking device 5 can be varied according to the practical requirements.

Figure 10:
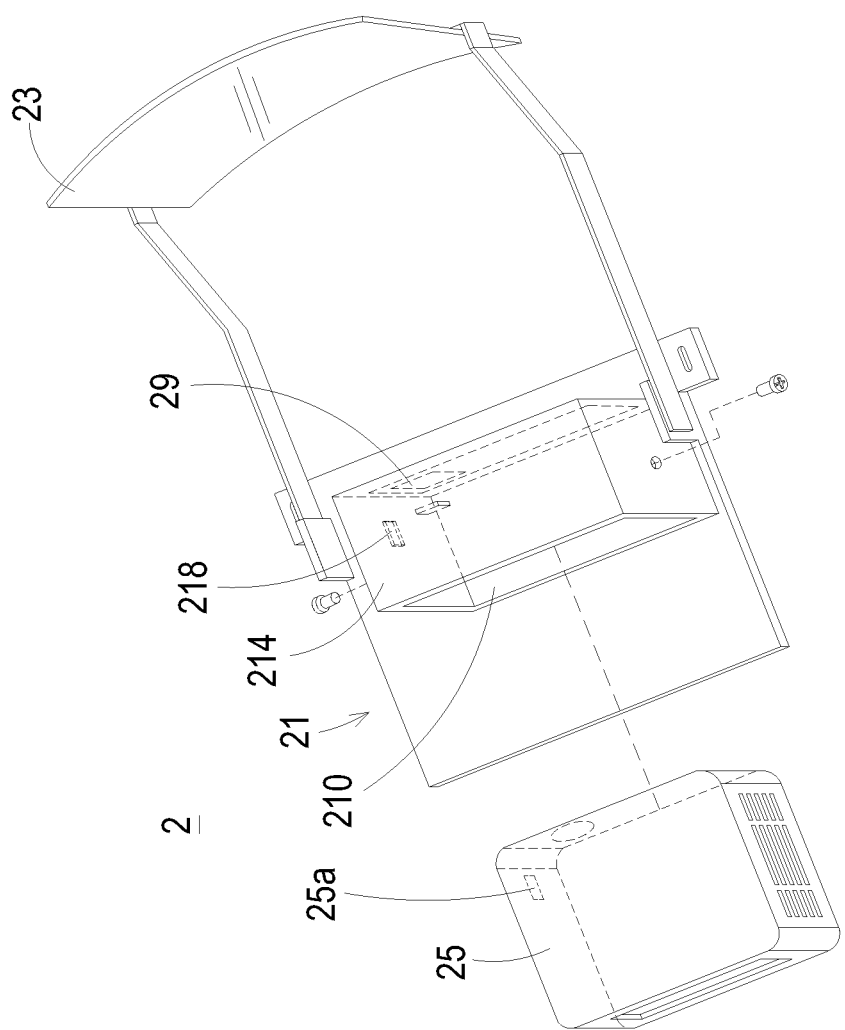
FIG. 10 schematically illustrates a head-up projection system for displaying navigation information in a vehicle according to a second preferred embodiment of the present invention.
Figure 11B:
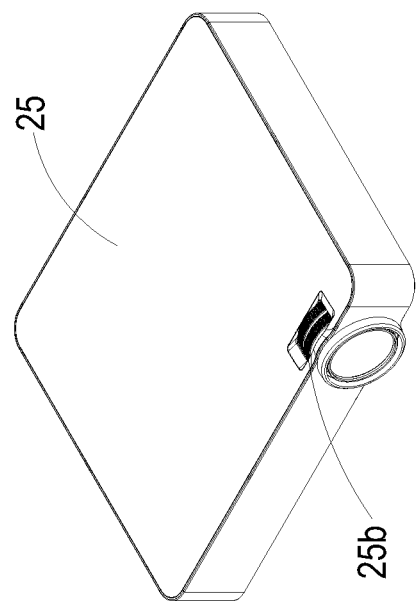
FIGS. 11A and 11B are schematic views showing various portable projector for the head-up projection system according to the second preferred embodiment of the present invention.
Figure 11A:
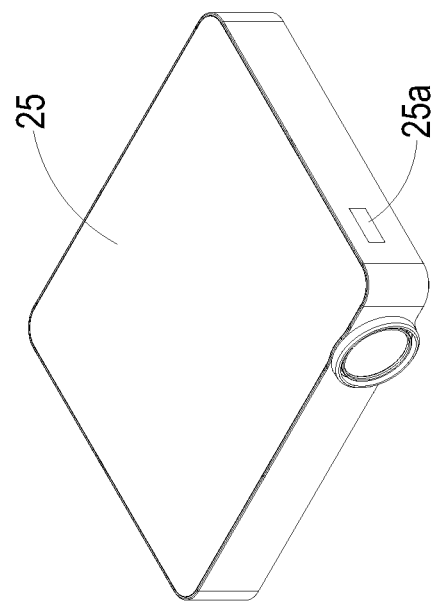

FIG. 10 schematically illustrates a head-up projection system for displaying navigation information in a vehicle according to a second preferred embodiment of the present invention. In this embodiment, the head-up projection system 2 also comprises a mounting member 21, an optical screen 23, a portable projector 25, and an optical unit 29. The structures and functions of the mounting member 21, the optical screen 23, the portable projector 25 and the optical unit 29 are similar to that as shown in FIGS. 3A and 3B, and it is not intended to describe redundantly. In this embodiment, the portable projector 25 has at least two operation modes including a normal display mode (for example a long-throw mode) for providing various presentation or image display functions outside the vehicle and a navigation display mode (for example a short-throw mode) for using in the head-up projection system to display navigation information image to the driver of the vehicle. As shown in FIG. 11A, the portable projector 25 further includes a switch 25a disposed on one side surface of the casing for switching the operation modes of the portable projector 25. The mounting member 21 further comprises an activator 218 disposed on an inner surface of the frame 214 and corresponding to the switch 25a of the portable projector 25 when the portable projector 25 is received in the receptacle 210 of the mounting member 21. Preferably, the activator 218 is a protrusion disposed on an inner surface of the frame 214. When the portable projector 25 is received in the receptacle 210 of the mounting member 21, the activator 218 is in contact with the switch 25a of the portable projector 25, so that the operation mode of the portable projector 25 can be switched to the navigation display mode automatically. When the portable projector 25 is detached from the mounting member 21, the activator 218 isn't in contact with the switch 25a of the portable projector 25, so that the operation mode of the portable projector 25 can be switched to the normal display mode automatically. Alternatively, the operation mode of the portable projector 25 can be switched by manual operation. As shown in FIG. 11B, the portable projector 25 further includes an adjusting ring 25b disposed on one surface of the casing for switching and adjusting the operation modes of the portable projector 25 by manual operation. In some embodiment, the portable projector 25 further comprises a brightness adjustment device (not shown) for adjusting the brightness of the projected image.

Figure 12:
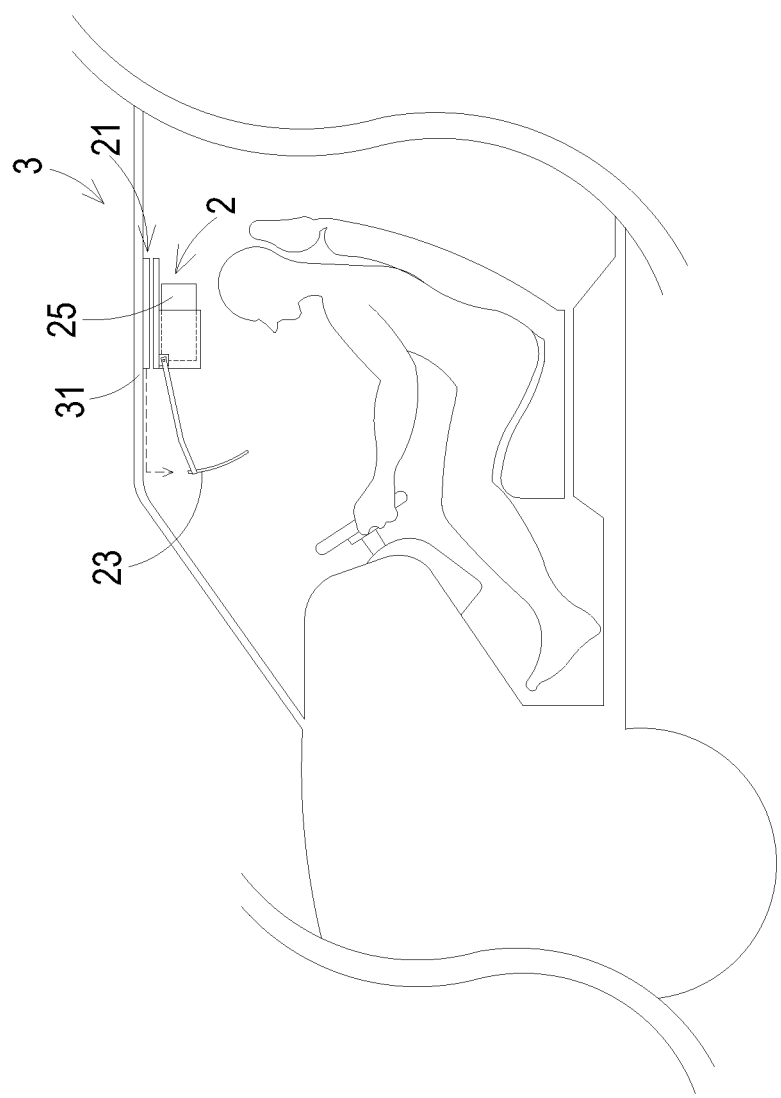
FIG. 12 schematically illustrates a head-up projection system for displaying navigation information in a vehicle according to a third preferred embodiment of the present invention.
Figure 13:
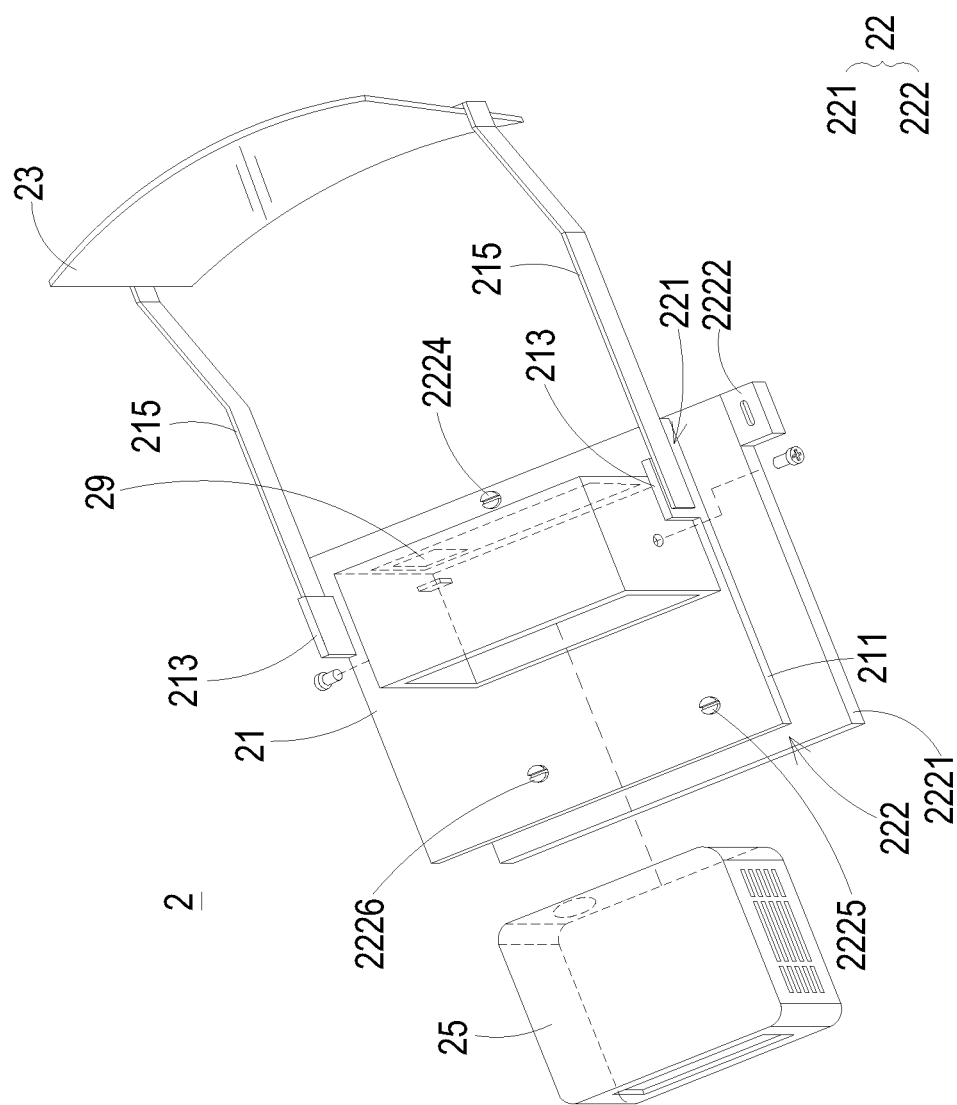
FIG. 13 schematically illustrates the configuration of the head-up projection system as shown in FIG. 12, wherein the portable projector is detached from the mounting member.

Please refer to FIGS. 12 and 13. FIG. 12 schematically illustrates a head-up projection system for displaying navigation information in a vehicle according to a third preferred embodiment of the present invention. FIG. 13 schematically illustrates the configuration of the head-up projection system as shown in FIG. 12, wherein the portable projector is detached from the mounting member. In this embodiment, the head-up projection system 2 also comprises a mounting member 21, an optical screen 23, a portable projector 25, and an optical unit 29. The structures and functions of the mounting member 21, the optical screen 23, the portable projector 25 and the optical unit 29 are similar to that as shown in FIGS. 3A and 3B, and it is not intended to describe redundantly. In this embodiment, the mounting member 21 further comprises an adjustment mechanism 22 for adjusting the position of the optical screen 23 of the head-up projection system 2 with respect to the position of the driver's eyes. The adjustment mechanism 22 comprises a precision adjustment mechanism 221 and a coarse adjustment mechanism 222. The precision adjustment mechanism 221 is configured to finely adjust the position of the optical screen 23 of the head-up projection system 2 with respect to the position of the driver's eyes and finely adjust the angle and position of the optical screen 23 with respect to the portable projector 25, so that the light from the portable projector 25 and reflected by the optical screen 23 can be transmitted toward the eyes of the driver for allowing the image to be seen by the driver. The coarse adjustment mechanism 222 is configured to adjust the position of the optical screen 23 of the head-up projection system 2 with respect to the position of the driver's eyes coarsely, so that the light form the portable projector 25 and reflected by the optical screen 23 can be transmitted toward the eyes of the driver for allowing the image to be seen by the driver. For example, when the driver adjusts the level of the driver seat or another driver replaces the original driver to drive the car, the driver can adjust the position of the optical screen 23 of the head-up projection system 2 with respect to the position of the driver's eyes by using the coarse adjustment mechanism 222, so that the light form the portable projector 25 and reflected by the optical screen 23 can be transmitted toward the eyes of the driver for allowing the image to be seen by the driver.

Figure 14A:
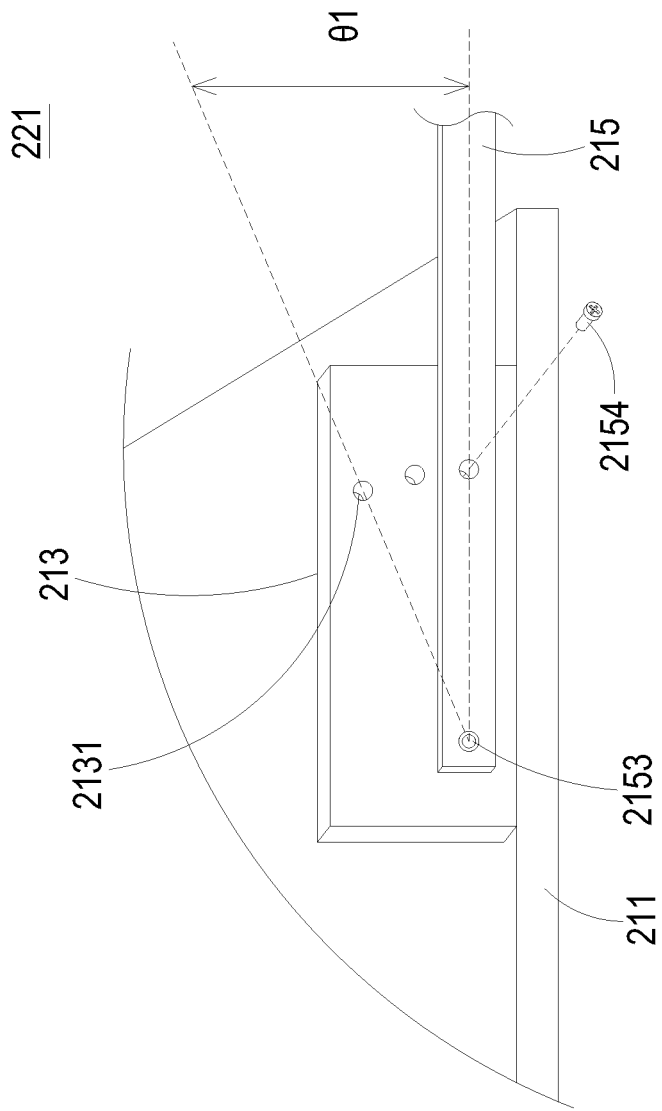
FIG. 14A schematically illustrates a first demonstrated precision adjustment mechanism of the head-up projection system of FIG. 13.

FIG. 14A schematically illustrates a first demonstrated precision adjustment mechanism of the head-up projection system of FIG. 13. In this embodiment, as shown in FIGS. 13 and 14A, the precision adjustment mechanism 221 of the head-up projection system 2 comprises the extension plate 213, the arm 215, and a first adjusting screw 2154. The extension plate 213 comprises a plurality of through holes 2131. The first end of the arm 215 is pivotally jointed to the extension plate 213 by a rotation shaft 2153. The arm 215 has a through hole corresponding to one or more of the through holes 2131 of the extension plate 213. The first adjusting screw 2154 passes through the through hole of the arm 215 and a corresponding through hole 2131 of the extension plate 213 for positioning the arm 215 with respect to the extension plate 213. Consequently, the angle $\theta_1$ and position of the optical screen 23 with respect to the portable projector 25 can be adjusted finely, and the position of the optical screen 23 of the head-up projection system 2 with respect to the position of the driver's eyes can be adjusted finely.

Figure 14B:
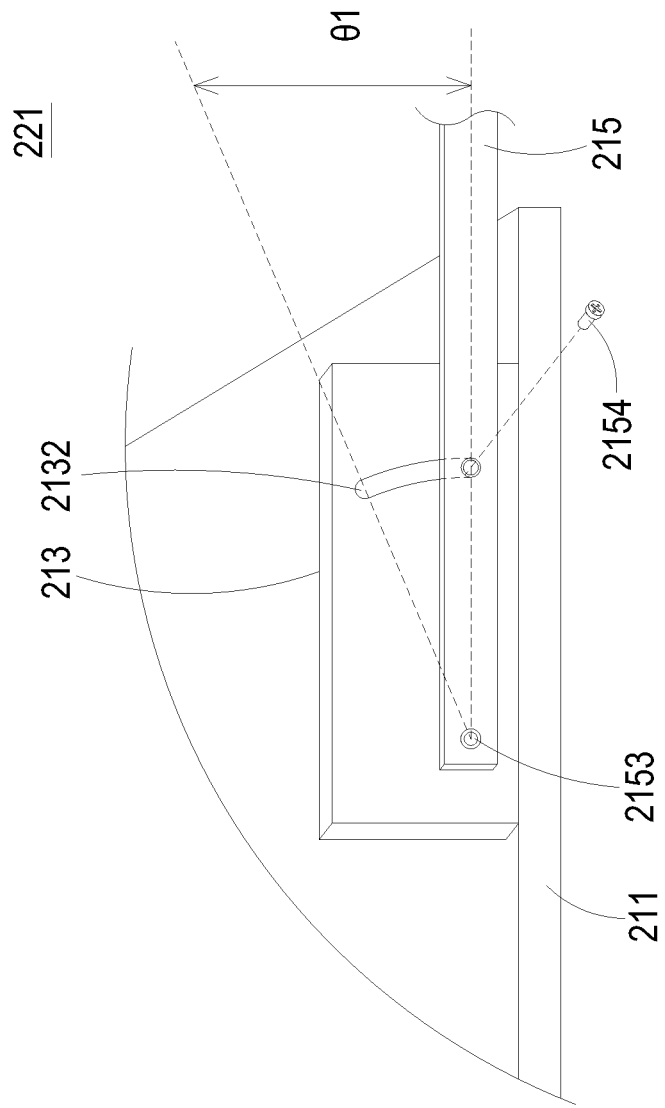
FIG. 14B schematically illustrates a second demonstrated precision adjustment mechanism of the head-up projection system of FIG. 13.

FIG. 14B schematically illustrates a second demonstrated precision adjustment mechanism of the head-up projection system of FIG. 13. In this embodiment, as shown in FIGS. 13 and 14B, the precision adjustment mechanism 221 of the head-up projection system 2 comprises the extension plate 213, the arm 215, and a first adjusting screw 2154. The extension plate 213 comprises a curved slot 2132. The first end of the arm 215 is pivotally jointed to the extension plate 213 by a rotation shaft 2153. The arm 215 has a through hole corresponding to the curved slot 2132 of the extension plate 213. The first adjusting screw 2154 passes through the through hole of the arm 215 and the curved slot 2132 of the extension plate 213 for positioning the arm 215 with respect to the extension plate 213. Consequently, the angle $\theta_1$ and position of the optical screen 23 with respect to the portable projector 25 can be adjusted finely, and the position of the optical screen 23 of the head-up projection system 2 with respect to the position of the driver's eyes can be adjusted finely. It is noted that the structure of the precision adjustment mechanism can be varied according to the practical requirements.

Figure 15:
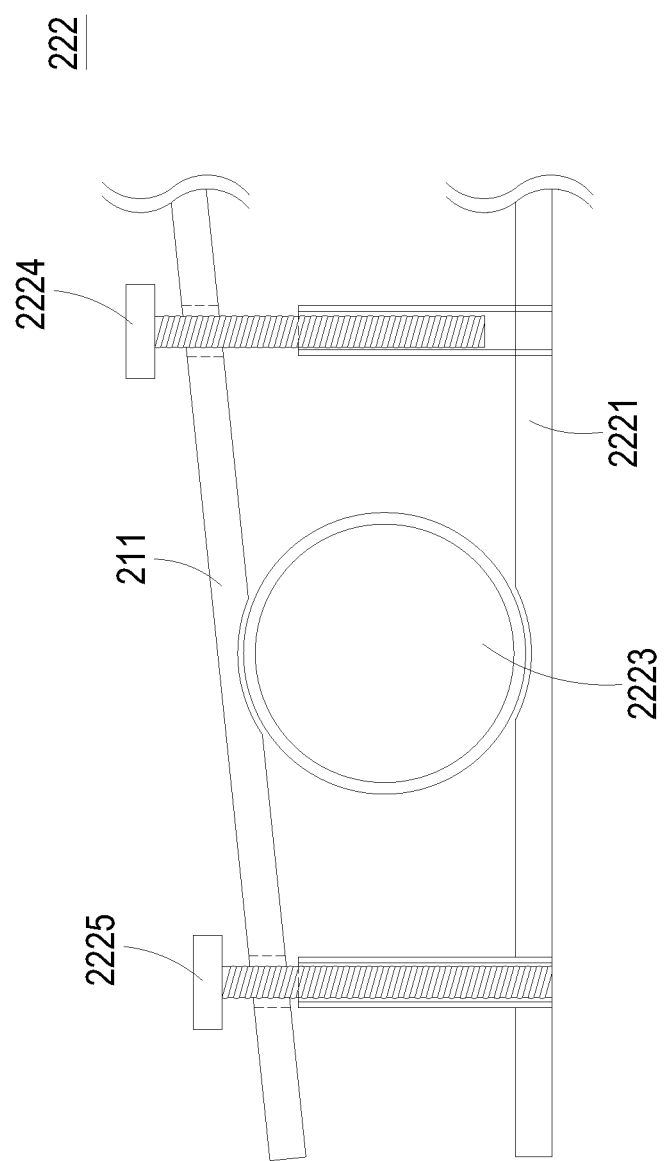
FIG. 15 schematically illustrates a demonstrated coarse adjustment mechanism of the head-up projection system of FIG. 13.

FIG. 15 schematically illustrates a demonstrated coarse adjustment mechanism of the head-up projection system of FIG. 13. In this embodiment, as shown in FIGS. 13 and 15, the coarse adjustment mechanism 222 of the head-up projection system 2 comprises the supporting plate 211, a base plate 2221, a ball 2223, a first adjusting screw 2224, a second adjusting screw 2225, and a third adjusting screw 2226. In this embodiment, two ear elements 212 of the supporting plate 211 as shown in FIGS. 3A and 3B can be omitted. Two ear elements 2222 of the mounting member 21 are extended outwardly from and horizontally with two opposite side edges of the base plate 2221, and two ear elements 2222 are opposite to each other. Each of the two ear elements 2222 has a through hole or a through slot for allowing a fixing element (for example screw, rivet or engaging element) to pass through and secured to the roof 31 of the vehicle 3, so that the mounting member 21 can be mounted on and secured to the specific area of the roof 31 of the vehicle 3. The ball 2223 is disposed between and in contact with the supporting plate 211 and the base plate 2221. The first adjusting screw 2224, the second adjusting screw 2225 and the third adjusting screw 2226 pass through the supporting plate 211 and the base plate 2221 respectively for adjusting the inclination angle between the supporting plate 211 and the base plate 2221. Consequently, the position of the optical screen 23 of the head-up projection system 2 with respect to the position of the driver's eyes can be adjusted coarsely. It is noted that the structure of the coarse adjustment mechanism can be varied according to the practical requirements.

From the above descriptions, the present invention provides a head-up projection system, which is useful, easy and simple to be installed in a variety of vehicles and is less costly to produce and install. In addition, the head-up projection system has a detachable projector. The projector can be mounted on the roof of the vehicle via a mounting member and connected to a mobile communication and computing device with navigation function, so that the navigation information can be displayed via the head-up projection system. When the head-up projection system isn't in use, the projector can be taken away from the vehicle for providing various presentation or image display functions.

Furthermore, the present invention also provides a roof-mounted head-up projection system and a mounting member thereof. The roof-mounted head-up projection system has an optical path different from that of a conventional head-up display system, so that the image resolution projected on the optical screen of the head-up projection system is enhanced and the image size can be well controlled to match with the size of the optical screen of the head-up projection system. In addition, the issues of image distortion can be avoided. Moreover, the roof-mounted head-up projection system and the mounting member have simple structures so that the driver can install the roof-mounted head-up projection system in the vehicle easily and simply by himself.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A head-up projection system, comprising:
a mounting member having a receptacle and mounted on a roof of a vehicle, the mounting member comprising:
a supporting plate;
at least two ear elements, extended outwardly from and horizontally with two opposite side edges of the supporting plate respectively, wherein each of the at least two ear elements has a through hole or a through slot for allowing a fixing element to pass through and secured to the roof of the vehicle;
a frame, disposed at one surface of the supporting plate and defining the receptacle with the supporting plate, wherein the receptacle has a first opening and a second opening, and the portable projector is accommodated in the receptacle of the mounting member from the second opening;
at least two extension plates, extended outwardly from the two opposite side edges of the supporting plate and vertically to the surface of the supporting plate respectively; and
two arms, each of the two arms having a first end pivotally jointed to the mounting member and a second end jointed with the optical screen, wherein the optical unit is disposed between the first ends of the two arms;
a portable projector detachably installed in the receptacle of the mounting member and configured to connect with a mobile communication and computing device with a navigation function for displaying a navigation information image in the vehicle from the mobile communication and computing device;
an optical screen; and
an optical unit disposed at an optical path between the portable projector and the optical screen,
wherein the optical unit disposed at the optical path between the portable projector and the optical screen for forming an intermediate real image of an image from the portable projector, and the optical screen is configured to form an enlarged virtual image of the intermediate real image and reflect a light from the optical unit toward the eyes of a driver.

2. The head-up projection system according to claim 1, wherein the portable projector is a handheld projector, a pocket projector, a mini projector or a MEMs laser pico-projector, and the mobile communication and computing device is a smart phone, a PDA, an information-entertainment system, a computing apparatus or a GPS.

3. The head-up projection system according to claim 1, wherein the portable projector is connected to the mobile communication and computing device via a signal transmission wire.

4. The head-up projection system according to claim 1, wherein the portable projector is fixed and positioned in the receptacle of the mounting member by at least one fastening device or at least one locking device.

5. The head-up projection system according to claim 1, wherein the portable projector has at least two operation modes including a normal display mode and a navigation display mode, the portable projector comprises a switch for switching the operation modes of the portable projector, the mounting member comprises an activator corresponding to the switch of the portable projector, and wherein when the portable projector is received in the receptacle of the mounting member, the activator is in contact with the switch of the portable projector and the operation mode of the portable projector is switched to the navigation display mode automatically.

6. The head-up projection system according to claim 1, wherein the portable projector has at least two operation modes including a normal display mode and a navigation display mode, and the portable projector comprises an adjusting ring for switching the operation modes of the portable projector.

7. The head-up projection system according to claim 1, wherein the optical unit comprises a diffuser, and the optical screen is a semi-transparent reflector.

8. The head-up projection system according to claim 7, wherein the optical screen is a concavo-convex semi-transparent reflector.

9. The head-up projection system according to claim 7, wherein the optical unit further comprises a condenser lens.

10. The head-up projection system according to claim 1, wherein the mounting member comprises an adjustment mechanism for adjusting a position of the optical screen with respect to the eyes position of a driver.

11. The head-up projection system according to claim 1, wherein the optical unit is disposed at the first opening of the frame.

12. A head-up projection system, comprising:
a mounting member having a receptacle and detachably mounted on a roof of a vehicle, the mounting member comprising:
  a supporting plate;
  at least two ear elements, extended outwardly from and horizontally with two opposite side edges of the supporting plate respectively, wherein each of the at least two ear elements has a through hole or a through slot for allowing a fixing element to pass through and secured to the roof of the vehicle;
  a frame, disposed at one surface of the supporting plate and defining the receptacle with the supporting plate, wherein the receptacle has a first opening and a second opening, and the portable projector is accommodated in the receptacle of the mounting member from the second opening;
  at least two extension plates, extended outwardly from the two opposite side edges of the supporting plate and vertically to the surface of the supporting plate respectively; and
  two arms, each of the two arms having a first end pivotally jointed to the mounting member and a second end jointed with the optical screen, wherein the optical unit is disposed between the first ends of the two arms;
a portable projector detachably installed in the receptacle of the mounting member;
an optical screen; and
an optical unit disposed at an optical path between the portable projector and the optical screen for forming an intermediate real image of an image from the portable projector,
wherein the optical unit disposed at the optical path between the portable projector and the optical screen for forming an intermediate real image of an image from the portable projector, and the optical screen is configured to form an enlarged virtual image of the intermediate real image and reflect a light from the optical unit toward the eyes of a driver.

13. The head-up projection system according to claim 12, wherein the portable projector is connected to a mobile communication and computing device via a signal transmission wire for displaying a navigation information image in the vehicle from the mobile communication and computing device.

* * * * *